(12) United States Patent
Wulff et al.

(10) Patent No.: US 7,608,653 B2
(45) Date of Patent: Oct. 27, 2009

(54) METHOD FOR ACCELERATING THE CROSS-LINKING PROCESS IN PAINTS

(75) Inventors: Christian Wulff, Mannheim (DE); Hans-Peter Seelmann-Eggebert, Limburgerhof (DE); Susanne Stutz, Weinheim (DE); Guenter Oetter, Frankenthal (DE)

(73) Assignee: BASF Aktiengesellschaft, Ludwigshafen (DE)

( * ) Notice: Subject to any disclaimer, the term of this patent is extended or adjusted under 35 U.S.C. 154(b) by 0 days.

(21) Appl. No.: 11/572,024

(22) PCT Filed: Jul. 15, 2005

(86) PCT No.: PCT/EP2005/007742

§ 371 (c)(1),
(2), (4) Date: Jan. 12, 2007

(87) PCT Pub. No.: WO2006/008094

PCT Pub. Date: Jan. 26, 2006

(65) Prior Publication Data

US 2007/0185256 A1    Aug. 9, 2007

(30) Foreign Application Priority Data

Jul. 16, 2004    (DE) .................. 10 2004 034 646

(51) Int. Cl.
*C08K 5/06* (2006.01)
*C09J 7/02* (2006.01)
*C09D 5/02* (2006.01)
*C04B 28/36* (2006.01)

(52) U.S. Cl. .................. 524/366; 524/378; 106/287.23

(58) Field of Classification Search .......... 524/366, 524/378; 510/421; 106/287.23
See application file for complete search history.

(56) References Cited

U.S. PATENT DOCUMENTS 4,923,515 A * 5/1990 Koike et al. ............. 106/31.58

2004/0077774 A1 * 4/2004 Ahrens et al. ............. 524/556
2004/0110655 A1 * 6/2004 Yamashita et al. .......... 510/421
2005/0049167 A1   3/2005 Noerenberg et al.

FOREIGN PATENT DOCUMENTS

| DE | 102 02 007 | 7/2003 |
| EP | 0 616 026 | 9/1994 |
| EP | 0 616 028 | 9/1994 |
| EP | 0 681 865 | 11/1995 |
| WO | 03 060049 | 7/2003 |

* cited by examiner

*Primary Examiner*—Mark Eashoo
*Assistant Examiner*—Angela C Scott
(74) *Attorney, Agent, or Firm*—Oblon, Spivak, McClelland, Maier & Neustadt, L.L.P.

(57) ABSTRACT

The present invention relates to a coating material formulation comprising a mixture comprising as component a1 at least one surfactant and as component a2 at least one compound corresponding to the general formula (I)

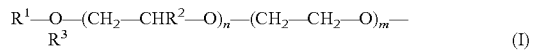

in which
$R^1$ is phenyl or substituted phenyl, $C_4$-$C_{14}$ alkyl,
$R^2$ is $C_1$-$C_8$ alkyl,
$R^3$ is hydrogen, $C_1$-$C_6$ alkyl, benzoyl, acetyl, acryloyl, methacryloyl,
n has an average value of 0 to 10,
m has an average value of 1 to 10, where $n+m \leq 10$ and $m > n$,
and the alkylene oxide structural units, which are different if appropriate, can be distributed randomly or arranged in blocks, 1%-95% by weight of film-forming binders and resins, 0%-80% by weight of fillers, 0%-40% by weight of pigments, 0%-20% by weight of additives and 0%-90% by weight of organic solvents and/or water, the sum of the weight percentages being 100% by weight, and to the use of the mixture of the invention for lowering the surface tension in a coating material by addition to the coating material.

10 Claims, No Drawings

METHOD FOR ACCELERATING THE CROSS-LINKING PROCESS IN PAINTS

The rapid wetting of surfaces plays a key part in many areas of everyday life and in numerous industrial operations, such as in the cleaning or coating of substrates, for example. In many formulations, therefore, varying quantities of alcohols such as ethanol or isopropanol are used in order, for example, to lower the surface tension, or interfacial tension, and so to improve the wetting capacity of the formulations. In this context it is usual to admix aqueous formulations with often relatively large amounts of these alcohols. The physiological effect of the alcohols, however, is cause for concern, and the exposure to the user of such formulations is high because of the high vapor pressure of the alcohols. Additionally, the alcohols contribute to the volatile organic compounds (VOC), may cause substrates to swell (e.g., plastics), and on evaporation form, if appropriate, an explosive mixture with air (antiexplosion measures). Consequently, nowadays, in formulations for example that are handled directly by the user, there should be only small quantities of alcohols, or none at all. For formulations providing very rapid wetting, however, such as fountain solutions in the printing industry or additives for coating formulations, spray coatings for example, these alcohols continue to constitute a necessary ingredient.

For some years now the very effectively wetting action of very hydrophobic, compact alcohols, which can be prepared from acetylene and aldehydes, has been known. The alcohols in question are, in particular, dihydroxyalkynes. These products, though, are not compatible with every formulation and can often be used only with the aid of solubilizers such as cumenesulfonate, ethylene glycol, etc. It is often necessary to use a relatively large quantity of the solubilizer in comparison to the wetting assistant, thereby giving rise to high sequential costs as a result of using the dihydroxyalkynes. Moreover, the action of the wetting assistant is impaired when it is blended with sizable quantities of solubilizers.

One common way of increasing the wetting rate of aqueous formulations is to use surfactants, which accumulate at interfaces, where they lower the surface tension. While adding alcohols such as ethanol or isopropanol to aqueous formulations gives the resultant water/solvent mixture a surface tension lower than that of water and hence an improved wetting behavior, the wetting or surface coverage when using surfactant systems is time-dependent. The surfactant molecules must first diffuse to the surface and built up an interface film thereon, thereby lowering the interfacial tension or surface tension on contact with water and air.

In the case of very rapid operations such as spraying or wetting operations, for instance, and in the case of curtain coating operations, for example, and of paints, the time within which the interfacial or surface tension is lowered by the surfactant system to the equilibrium value is critical. The dynamics of the surfactant system are of great importance for the wetting rate.

At the present time alcohol ethoxylates of lower alcohols are used as suitable wetting agents. As an inevitable result of their preparation, however, such products frequently comprise amounts of alcohol, which again contributes critically to rapid wetting and in the case of very short wetting times is if appropriate the only wetting component.

The use of alkyl glycol alkoxylates or alkyl diglycol alkoxylates which are obtainable by alkoxylating $C_{4-8}$ alkyl glycols or diglycols with $C_{2-5}$ alkoxides to an average degree of alkoxylation of 1 to 8, based on $C_{4-8}$ alkyl glycols or diglycols, in aqueous formulations is known from WO 03/60049.

DE 102 02 007 A1 discloses alkyl glycol alkoxylates which are obtainable by alkoxylating $C_{4-8}$ alkyl glycols or diglycols with $C_{2-5}$ alkoxides to an average degree of alkoxylation of 1 to 8, based on $C_{4-8}$ alkyl glycols or diglycols, and mixtures thereof with surfactants, which in solution in an amount of 5 g/l of water exhibit a surface tension of less than 46 mN/m at 20° C., and/or dihydroxyalkynes or derivatives thereof.

With the increasing speeds of operations in the preparation and also application of paints a part is now played not only by the general effectiveness of a wetting agent but also, quite critically, by the rate at which the desired effect (in this case, wetting, or reduction in surface tension) is achieved. Wetting processes are generally completed in the order of milliseconds.

Moreover, on environmental grounds, coating materials, paints for example, that are based on water as their solvent are being used with increasing frequency. The surface tension of water, at about 72 mN/m, is significantly higher than that of organic solvents. For instance the surface tension of hydrocarbons is about 25-35 mN/m, that of butyl glycol 27 mN/m and that of butyl acetate 26 mN/m. Frequently used mixtures of water-soluble organic solvents (such as butyl glycol) with water lead likewise, correspondingly, to surface tensions which are higher than that of the organic solvent alone (e.g., 5% butyl glycol in water=37 mN/m).

The need to reduce the surface tension and the difficulty of doing so in the order of milliseconds become even greater, therefore, with the transition to water-based paints, and the performance of conventional surfactants has to be improved. On the other hand it is desirable for an efficient system that an improvement in performance should not go hand in hand with an increase in the quantity employed.

The reduction of surface tension results, for example, in improved pigment wetting, improved substrate wetting, and improved flow. The latter produces a smooth surface, which leads to the avoidance of defects referred to as orange peel effect, texturing, craters, fish eyes, brush marks, running, bittiness or pinholes.

It is an object of the present invention to provide a coating material formulation which comprises mixtures of surfactants with further compounds, called boosters, in order thereby to improve the wetting behavior of aqueous formulations of coating materials. This is achieved by means of a reduction in the surface tension in general and in particular a significant reduction in the surface tension after just a short time.

A further object is that the mixtures of surfactant and booster of the invention, used in solution in the coating material formulations, must not be used at a greater concentration than the surfactant alone. The effect according to the invention should come about both in the case of solutions of the mixtures in water and in mixtures of water and organic solvents. The mixtures of surfactant and booster should additionally be low-foam mixtures, and the surfactants used should be effectively wetting surfactants.

These objects are achieved in accordance with the invention by means of a coating material formulation comprising
(A) 0.001%-15%, preferably 0.01%-10%, more preferably 2%-10% by weight of a mixture, as component (A), comprising as component a1 at least one surfactant and as component a2 at least one compound corresponding to the general formula (I)

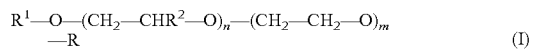

$$R^1-O-(CH_2-CHR^2-O)_n-(CH_2-CH_2-O)_m-R \quad (I)$$

in which
$R^1$ is phenyl or substituted phenyl, $C_4$-$C_{14}$ alkyl,
$R^2$ is $C_1$-$C_8$ alkyl,
$R^3$ is hydrogen, $C_1$-$C_6$ alkyl, benzoyl, acetyl, acryloyl or methacryloyl, n has an average value of 0 to 10, m has an average value of 1 to 10, where n+m≦10 and m>n, and the alkylene oxide structural units, which are different if appropriate, can be distributed randomly or arranged in blocks, (B) 1%-95%, preferably 5%-80% by weight of film-forming binders and resins as component (B), (C) 0%-80%, preferably 0%-60%, more preferably 0%-40% by weight of fillers as component (C), (D) 0%-40%, preferably 0%-35%, more preferably 5%-30% by weight of pigments as component (D), (E) 0%-20%, preferably 0%-10% by weight of further additives as component (E), and (F) 0%-90%, preferably 0%-70%, more preferably 15%-50% by weight of a mixture of optionally organic solvents and/or water as component (F), the sum of the weight percentages of components (A) to (F) being 100% by weight, and the mixture (A) at a concentration of 0.2 g/l in water at 23° C. leads to a reduction in the contact angle on steel in comparison to pure water after 1 s by at least 15°, preferably at least 20°, and the mixture in the CNOMO (prEN 14371: 2004, 0.1 g/l, 25° C., measurement in water) produces a foamability of less than 1200 ml during pumped circulation. Preferably the mixtures in a 5% strength butyl glycol solution (5% butyl glycol in water) ought to achieve a foamability of less than 300 ml. With particular preference the foam volume 5 minutes after the end of circulation when investigating the abovementioned aqueous solution is less than 300 ml and when investigating the solution in 5% butyl glycol is less than 50 ml. Measurement takes place in each case on solutions at a concentration of 0.1 g of mixture in 1 liter of solution. Measurement temperature: 25° C. Particular preference is given to mixtures which in the CNOMO (prEN 14371:2004, 0.1 g/l, 25° C., measurement in water) produce a foamability of less than 300 ml during pumped circulation.

$R^1$ is a $C_4$-$C_{14}$ alkyl radical, which can be linear or branched, or a phenyl or substituted phenyl radical. Preferably $R^1$ is a $C_4$-$C_{10}$ alkyl radical or a substituted phenyl radical, more preferably a linear $C_4$-$C_{10}$ alkyl radical or a phenyl or substituted phenyl radical, very preferably a linear $C_4$-$C_8$ or $C_{10}$ alkyl radical or a phenyl radical.

Substituents present on the phenyl radical can be linear or branched $C_1$-$C_{14}$ alkyl radicals, optionally substituted by one or more functional groups selected from the group consisting of amido, imido, carboxylic ester, halide and ether group. Preferably $C_1$-$C_{14}$ alkyl radicals, with preference $C_1$-$C_9$ alkyl radicals, present optionally, are not substituted.

Particularly preferred radicals $R^1$ are radicals derived from the following alcohols: hexanol, phenol, butanols, especially n-butanol and isobutanol, pentanols, tert-amyl alcohol, heptanols, octanols, especially n-octanols, 2-ethylhexanol, isononanol, decanol, isodecanol, 2-propylheptanol. In addition, it is also possible to use mixtures, such as a $C_4$-$C_8$ alcohol cut or a $C_5$-$C_9$ alcohol cut.

The radical $R^2$ in the general formula (I) is $C_1$-$C_8$ alkyl. More preferably $R^2$ is $C_1$-$C_3$ alkyl, and with particular preference $R^2$ is methyl.

The radical $R^3$ in the general formula (I) is hydrogen, $C_1$-$C_6$ alkyl, benzoyl, acetyl, acryloyl or methacryloyl, preferably hydrogen, methyl or butyl, more preferably hydrogen or methyl. The radical $R^3$, if it is other than hydrogen, serves as what is called an endgroup cap in order to stabilize the product, when it is used in alkaline solution, for example. In one preferred embodiment $R^3$ is hydrogen.

The alkylene oxide blocks ($CH_2$—$CHR^2$—O) and ($CH_2$—$CH_2$—O) are structural units which are prepared by alkoxylating the corresponding alcohols $R^1$—OH by reacting them with a compound selected from the group consisting of ethylene oxide, propylene oxide, butylene oxide, pentylene oxide, hexylene oxide, heptylene oxide, octylene oxide, nonylene oxide, decylene oxide and mixtures thereof, preferably selected from the group consisting of ethylene oxide, propylene oxide, butylene oxide and mixtures thereof, more preferably selected from ethylene oxide, propylene oxide and mixtures thereof. Where different alkylene oxides are used the reaction can be carried out with the different alkylene oxides in blocks (successively or alternately) or simultaneously (random or mixed procedure).

n describes the number of units ($CH_2$—$CHR^2$—O), and m describes the number of units ($CH_2$—$CH_2$—O), in the compounds of the general formula (I). In the compounds of the general formula (I) n has an average value of 0 to 10. m in the compounds of the general formula (I) has an average value of 1 to 10. The sum of n and m is ≦10 and m is >n.

In one preferred embodiment n has an average value ≦2 and m has an average value of 3 to 10.

In a further preferred embodiment in the compound of the general formula (I) n=0 and m=3-9 if $R^1$ is phenyl.

In a further preferred embodiment in the compound of the general formula (I) n is ≦2 and m=3-6 if $R^1$ is a $C_4$-$C_{14}$-alkyl.

The values n and m represent average values, since in the alkoxylation of alcohols in general a distribution of the degree of alkoxylation is obtained. Consequently n and m may differ from integral values. The distribution of the degree of alkoxylation can be adjusted to a certain extent by using different alkoxylation catalysts. Where besides ethylene oxide one or more longer-chain alkylene oxides as well are used, the different alkylene oxide structural units can be randomly distributed, alternating or in the form of two or more blocks in any order. The average value of the homologous distribution is represented by the stated numbers n and m.

The alkylene oxide blocks are composed preferably only of ethylene oxide units.

With very particular preference the following are used as compounds of the general formula (I):

butanol+3 EO, butanol+4 EO, butanol+5 EO, butanol+6 EO, hexanol+3 EO, hexanol+4 EO, hexanol+5 EO, hexanol+6 EO, phenol+3 EO, phenol+4 EO, phenol+5 EO, phenol+6 EO The stated values for the amount of EO are rounded. Particular preference is given to the abovementioned compounds based on hexanol and phenol.

The compounds of the general formula (I) according to the invention are obtained for example by alkoxylating alcohols of the general formula $R^1$—OH with alkylene oxides which correspond to the units ($CH_2$—$CHR^2$—O) and ($CH_2$—$CH_2$—O) in A. This alkoxylation may be followed by an etherification, with dimethyl sulfate for example, or esterification, if the radical $R^3$ is not hydrogen.

The alkoxylation can be carried out for example using alkaline catalysts such as alkali metal hydroxides or alkali metal alkoxides. The use of these catalysts results in specific properties, particularly the distribution of the degree of alkoxylation.

The alkoxylation can be carried out, moreover, using Lewis-acid catalysis with the resultant specific properties, particularly in the presence of $BF_3 \times H_3PO_4$, $BF_3$ dietherate, $BF_3$, $SbCl_5$, $SnCl_4 \times 2\, H_2O$, hydrotalcite. Catalyst suitability is also possessed by double metal cyanide (DMC) compounds.

The excess alcohol can be distilled off, or the alkoxylate can be obtained by a two-stage operation. The preparation of mixed alkoxylates from, for example, ethylene oxide (EO)

and propylene oxide (PO) is also possible, in which case first a propylene oxide block and then an ethylene oxide block may attach to the alcohol residue, or first an ethylene oxide block and then a propylene oxide block. Random distributions as well are possible. Preferred reaction conditions are indicated below.

The alkoxylation is preferably catalyzed by strong bases, which are appropriately added in the form of an alkali metal hydroxide or alkaline earth metal hydroxide, generally in an amount of 0.1% to 1% by weight, based on the amount of the alcohol $R^1$—OH (cf. G. Gee et al., J. Chem. Soc. (1961), p. 1345; B. Wojtech, Makromol. Chem. 66, (1966), p. 180).

Acid catalysis of the addition reaction as well is possible. Besides Brönsted acids suitability is also possessed by Lewis acids, such as $AlCl_3$ or $BF_3$ (cf. P. H. Plesch, The Chemistry of Cationic Polymerization, Pergamon Press, New York (1963)).

The alkoxylation can also be carried out by double metal cyanide catalysts in accordance with methods that are known to the skilled worker. As a double metal cyanide (DMC) compound it is possible in principle to use all of the suitable compounds that are known to the skilled worker. DMC compounds of catalyst suitability are described for example in WO 99/16775 and DE-A-10117273.

The addition reaction is performed at temperatures of about 90 to about 240° C., preferably of 120 to 180° C., in a closed vessel. The alkylene oxide or the mixture of different alkylene oxides is supplied to the mixture of inventive alcohol, or alcohol mixture, and alkali under the vapor pressure of the alkylene oxide mixture at the chosen reaction temperature. The alkylene oxide can be diluted if desired at up to about 30% to 60% with an inert gas. This provides additional security against explosive polyaddition or decomposition of the alkylene oxide.

If an alkylene oxide mixture is used then polyether chains are formed in which the different alkylene oxide building blocks are distributed virtually at random. Variations in the distribution of the building blocks along the polyether chain arise as a result of different reaction rates of the components and can also be achieved arbitrarily by continuously supplying an alkylene oxide mixture whose composition is under programmed control. Where the different alkylene oxides are reacted in succession the products are polyether chains with a blockwise distribution of the alkylene oxide building blocks.

The length of the polyether chains within the reaction product fluctuates statistically around an average value which corresponds essentially to the stoichiometric value resulting from the amount added.

To prepare the compounds of the general formula (I) it is also possible to use alkyl glycol alkoxylates or alkyl diglycol alkoxylates which are obtainable by alkoxylating corresponding phenyl, substituted phenyl, or $C_{4-14}$ alkyl glycols or diglycols with $C_{2-9}$ alkoxides, preferably up to an average degree of alkoxylation corresponding to that of the aforementioned compounds of the general formula (I). These products are then etherified or esterified if appropriate, with hydrogen in the terminal hydroxyl group being replaced by $R^3$.

The preparation takes place here starting from corresponding alcohol-free, preferably pure alkyl glycols and alkyl diglycols, and not, as described above, starting from alkanols, by alkoxylation. Therefore the product mixtures also do not comprise any remaining alkanols, but only, at most, alkyl glycols. The result is a distribution in the degree of alkoxylation that is specific for alkyl glycols. As a result of this preparation process the alkyl glycol alkoxylates are free from alcohols.

Alkoxylates are oligomeric or polymeric reaction products with alkoxides. Owing to the kinetics of polymerizations, which are known to the skilled worker, there is automatically a statistical distribution of homologs, the average value of which is normally specified. The frequency distribution of the homologs includes the starting material, particularly for low degrees of alkoxylation. Although it is possible to influence the distribution to a certain extent through the choice of catalyst, there is nothing different in principle about the distribution curve. Pure alkyl oligoglycols can be prepared only by means of distillative or chromatographic workup and are therefore expensive. Moreover it has been found that the distribution of the homologs has an influence on the aggregation behavior.

The alkoxylates described in this embodiment possess the homolog distribution which is important for the aggregation behavior and for the other properties according to the invention, without comprising alcohol.

The products obtained by the other processes are freed from remaining alcohols. The expression "alcohol-free" refers to alkoxylates which have no amounts of alkanols, especially $R^1$—OH, that are measurable by means of gas chromatography (GC). The distribution of the degrees of alkoxylation can be determined by chromatographic processes. Since there are no alcohols in the product mixture obtained by the embodiment described, the mixture is substantially odorless.

For a comparison between alcohol alkoxylates and alkyl glycol alkoxylates reference is made to WO 03/60049.

The mixture used in the coating material formulation in accordance with the invention, mixture (A), comprises besides the above-described component a2 at least one surfactant as component a1.

The surfactants can, generally speaking, be alkoxylated alcohols, amides, acids, betaines, amine oxides or amines, but also dihydroxyalkynes and derivatives and mixtures thereof. The rate at which the end level of the surface tension is established may depend on the molecular architecture, such as the chain length and degree of branching of the alcohol, the length and solvation of the alkoxylate, the surfactant concentration and the aggregation of surfactant. In general, smaller aggregates diffuse more rapidly than do large aggregates.

In one preferred embodiment component a1 comprises precisely one surfactant. In a further preferred embodiment component a1 includes at least one nonionic surfactant.

Surfactant is the collective designation for surface-active substances; surfactants, from their solution, accumulate heavily at interfaces, where they lower the surface tension. As a result of a reduction in surface tension, immiscible liquids become miscible, liquid impurities and solid dirt particles are emulsified or dispersed, and the wetting of liquids on solid surfaces is improved.

Surfactants for the purposes of this application are composed of a hydrophobic molecular moiety and a hydrophilic head group. Depending on the nature and charge of the hydrophilic head group a distinction is made between anionic, nonionic, cationic and amphoteric surfactants. Anionic and cationic surfactants form ions in aqueous solution, while amphoteric surfactants give rise to zwitterions. In the case of the nonionic surfactants, in contrast, there is no electrolytic dissociation in aqueous solution.

Solutions of surfactants in water (concentration 5 g/l) commonly have a surface tension at 20° C. of less than 45 mN/m. Examples of surfactants are described in K. Robert Lange "Surfactants—A Practical Handbook".

Examples of nonionic surfactants are:

alcohol alkoxylates, alcohol ethoxylates, EO/PO block copolymers (Pluronics), fatty acid esters, alkanolamides, amine ethoxylates, amine oxides, fatty acid esters of sorbitol, alkylglycosides and alkylpolyglycosides, alkylglutamides, alkynediols and ethoxylated alkynediols.

Examples of anionic surfactants are:

carboxylic acids, carboxylated ethoxylates, arylsulfonates, alkylbenzenesulfonates, α-olefinsulfonates, alkylsulfonates, alkylnaphthalenesulfonates, sulfonated fatty acid esters, sulfosuccinates, phosphoric esters, alkyl sulfates, alkyl ether sulfates.

Examples of cationic surfactants are:

quaternized amines, alkylammonium halides, tetraalkylammonium halides, amine oxides, N-alkylpyridinium halides.

Examples of amphoteric surfactants are:

amino acids, alkyl betaines, amidoalkyl betaines, cocoamidopropyl betaine, heterocyclic betaines.

Examples of silicosurfactants are: polyether siloxanes. Additionally fluorosurfactants can be used.

In one preferred embodiment the surfactants are nonionic surfactants. In a further preferred embodiment precisely one nonionic surfactant is used. With particular preference the nonionic surfactant or surfactants which can be employed is or are selected from $C_2$-$C_5$, preferably $C_2$-$C_4$ alkoxylates of $C_9$-$C_{20}$, preferably $C_9$-$C_{15}$, especially $C_9$-$C_{13}$ alcohols which have on average a degree of alkoxylation of 3 to 30, preferably 4 to 15, more preferably 5 to 12, or mixtures thereof. In particular, $C_9$-$C_{11}$ alcohols are used to synthesize the surfactants. These can be linear or branched alcohols. In the case of a branched alcohol the degree of branching (corresponding to the number of methyl groups in the alcohol minus one) is preferably in the range from 1.1 to 1.5. Alkoxylation can take place with any desired $C_2$-$C_4$ alkoxides and mixtures thereof. Thus alkoxylation can take place with ethylene oxide, propylene oxide or butylene oxide. Particular preference is given to using ethylene oxide, propylene oxide or mixtures thereof. Ethylene oxide is particularly preferred. The degree of alkoxylation is on average 4 to 15, preferably 5 to 12. Nonionic surfactants of this kind are known and are described for example in EP-A 0 616 026 and EP-A 0 616 028.

Surfactants suitable for the application described here in coating material formulations are those which result in effective wetting of an aqueous formulation on solid surfaces. Even in surfactants possessing inherently good wetting the wettability is further enhanced by adding component a2. This can be described, for example, by means of the contact angle on stainless steel. The contact angle of an aqueous solution (0.2 g/l, 23° C., no other additives) of an effectively wetting surfactant on stainless steel ought after 10 s to be smaller by at least 15° C. than the contact angle of pure water on the same surface. Preference is given to a reduction by at least 25°, more preferably by at least 35° C. Some (a few) surfactants even achieve a reduction by more than 50°.

Suitable surfactants are all those which at the same time are also considered low-foam surfactants, in order that the surfactants themselves do not lead to unwanted effects, such as the loss of gloss of a paint, for example, by stabilizing foam. Surfactants awarded the epithet low-foam for the purposes of the present invention are all those which in the CNOMO (circulation foam test according to prEN 14371:2004) in aqueous solution achieve a foamability of less than 1200 ml. Preferably the surfactants in a 5% strength butylglycol solution (5% butylglycol in water) ought to achieve a foamability of less than 300 ml. With particular preference the foam volume 5 minutes after the end of circulation when the above-mentioned aqueous solution is investigated is less than 300 ml and when the solution in 5% butylglycol is investigated is less than 50 ml. Measurement takes place in each case on solutions at a concentration of 0.1 g of test substance in 1 liter of solution at a measurement temperature of 25° C.

In one preferred embodiment in mixture (A) the ratio of component a1 to component a2 is 1:4 to 20:1; with particular preference there is more component a1 than component a2 in mixture (A), and with very particular preference the ratio of a1 to a2 is from 6:4 to 8:2.

In the coating material formulation of the invention film-forming binders and resins are used. In the case of paints, binders, according to DIN 55945 (December 1988), are the nonvolatile fraction or fractions (excluding pigment and filler but including plasticizers, siccatives and other nonvolatile auxiliaries) which in some cases are applied even from the melt (in the case of powder coating) or are brought to reaction by radiation; the designation of such binders is standardized in DIN 55950 July 1978). The purpose of the binders is the binding of the pigment particles with one another and the adhesion to the substrate.

Suitable binders are selected from the group consisting of nitrocellulose, alkyd resins, polyester resins, melamine-formaldehyde resins, acrylic resins, dispersions such as aqueous acrylate dispersions and aqueous acrylate-styrene dispersions, water-soluble alkyd resins, polyurethane resins, polymers of vinyl chloride or vinyl ethers, epoxy acrylates, polyester acrylates, polyether acrylates, urethane acrylates, aldehyde resins, ketone resins, amino resins, carbamide resins, casein and mixtures thereof.

The coating material formulation of the invention optionally also comprises fillers. Specifically in coating materials a filler according to DIN 55943: 1993-November and DIN EN 971-1: 1996-September is a substance in granular or in powder form which is insoluble in the application medium and is used in coating materials in order to achieve or influence certain physical properties.

Examples of fillers suitable in accordance with the invention include silicates, aluminum silicates (e.g. kaolin), heavy spar (barium sulfate), chalk, talc, quartz flour, calcium carbonate, dolomite, Ca bentonite and organic fillers.

Optionally the coating material formulation of the invention may comprise pigments. Typical pigments are described in H. Kittel, Lehrbuch der Lacke und Beschichtungen, volume 2, Verlag W. A. Colomb, ISBN 3-87903-044-8. They comprise, for example, titanium dioxide, oxidic mixed-phase pigments, zinc oxide, chromium oxide, iron oxide, red lead, antimony oxide, sulfide pigments, cadmium pigments, ultramarine pigments, antimony sulfide, chromate pigments, phosphate pigments, phosphite pigments, silicate pigments, cyanide pigments, lead and plumbate pigments, lead antimonate, calcium plumbate, manganese pigments, cobalt pigments, metal powders, magnetic pigments, pearlescent pigments, surface-treated pigments, core pigments, pigment-grade carbon blacks, and organic pigments.

Optionally the coating material formulation of the invention may comprise further additives. Customary additives—see Johan Bielemann "Lackadditive" [Additives for Coatings]—fall into the following classes:

additives which influence the rheology of the formulation, examples being thickeners such as organophyllosilicates, cellulose derivatives, polyurethane thickeners, hydrogenated castor oil, polyamides, sulfonates, silica;

surface-active compounds such as wetting agents and dispersants (surfactants, acrylic polymers, polyurethanes, for example), defoamers (silicone oils, alkoxylates, hydrophobic silicas, urea derivatives, mineral oils, vegetable/animal oils, emulsions/dispersions, for example) adhesion promoters (organofunctional silanes, organometallic compounds such as titanates, zirconates and zirconium aluminates, chlorinated olefins, condensates such as polyesters, phosphoric esters, polyethylenimine, silicones, silicone-modified polymers, talc, for example) and wetters (silicone additives, alkoxylates, for example);

additives for surface modification (silicone additives, waxes, synthetic silicas, natural silicas, talc, urea-formaldehyde resins, for example);

flow assistants and film-forming assistants (polymers such as polyacrylates or cellulose acetobutyrate, silicones, fluorosurfactants, solvents, benzines, esters, ketones, ether alcohols, glycols);

catalytically active compounds (siccatives, metal soaps, acidic and basic polymerization catalysts);

antiskinning agents (phenols, oximes, methyl ethyl oxime, solvents, retention agents, for example);

light stabilizers (UV absorbers such as (2-hydroxyphenyl)-benzotriazoles, hydroxyphenyl-s-triazines, 2-hydroxybenzophenones, oxalanilides; quenchers such as organic nickel compounds; free-radical scavengers such as sterically hindered amines (HALS), peroxide decomposers such as thioethers, phosphites, HALS, for example);

corrosion inhibitors;

biocides;

flame retardants;

photoinitiators (in UV-curable paints).

Depending on the nature of the organic binders it is possible for the coating material formulations optionally to comprise solvents and/or water. Preferably the coating material formulations of the invention comprise organic solvents and water. The organic solvent/water solvent mixture which can be used with particular preference is composed of at least 50%, more preferably of at least 90%, water, based in each case on the total amount of water and organic solvent.

Typical organic solvents are selected from the group consisting of butyl acetate, butyl glycol, propylene glycol methyl ether, n-butanol, isopropanol, xylene, benzine and mixtures thereof.

Powder coating materials are substantially free from solvents.

A paint is a coating material. According to DIN EN 971-1: 1996-September a paint is a pigmented coating material in liquid or paste or powder form, which, applied to a substrate, produces a hiding coating having protective, decorative or specific technical properties. The technical expression "paint", and "varnish" too, is used for pigmented and unpigmented coating materials. An unpigmented paint or varnish is generally referred to as a clearcoat.

According to DIN EN 971-1: 1996-September a coating material is a product in liquid or paste or powder form, which, applied to a substrate, produces a coating having protective, decorative and/or other specific properties. The German technical expression "Beschichtungsstoff" in the sense of said DIN standard is the generic term for paints, varnishes and similar products. According to DIN EN 971-1: 1996-September coating materials are also coating materials for producing synthetic resin products, troweling compositions, surfacers, floor-coating compositions, and similar substances.

"Substrate" is the general term for the surface underlying a paint film or coating film. A suitable substrate for architectural paints and stains is any material inside and outside a building. Examples are facades, walls, windows, furniture, renders, concrete, plaster, floors, woodblock flooring, synthetic-resin screed, tank areas, metal structures and parts made of plastic.

Illustrative definition of surface tension: the surface tension is the tension which occurs at the surface, or interface, between two i miscible substances. Surfactants are capable of accumulating at the interface and hence lowering the surface tension.

The surface tension between a liquid and a solid results in what is called the contact angle. Wetting agents in this context are substances which, in solution, lower the surface tension of water or other liquids so that they reach the surfaces of solids more effectively. If the liquid does not penetrate into the surface, then the wetting agent results in better distribution of the liquid on the surface, thereby lowering the contact angle.

An important factor for application in coating material formulations is the foam behavior of the wetting agents. To characterize the foam behavior the circulation foam test (CNOMO) was selected. In the circulation foam test according to standard prEN 14371 500 ml of surfactant solution are pumped in circulation continuously at a rate of 200 l/h. The foam is formed because the solution falls from a nozzle onto the surface of the liquid. The process of circulatory pumping (circulation) is carried out for 10 minutes, the foam volume in a measuring cylinder being determined every 30 s. After 10 minutes the circulatory pumping (circulation) is terminated and for a further 5 minutes the foam volume is determined every 30 seconds. Foaming surfactants reach foam volumes of up to ≧1.5 l (overfoaming), while low-foam surfactants can achieve foam volumes of less than 300 ml.

The present invention also relates to the use of the mixture (A) of the invention for lowering the surface tension in a coating material by addition to the coating material.

In one particular embodiment the coating material is a paint formulation. In this context use may be made of all of the coating materials that are known to the skilled worker. By way of example there may be mentioned: alkyd resin paint, emulsion paints, epoxy resin paint, polyurethane paint, acrylic resin paint, cellulose nitrate lacquer, spirit varnish, water-based paint, powder coating material, high-solid paint, thixotropic paint, liquid paint, spray paint, dip-coating material, flow-coating material, curtain-coating material, baking varnish, two-component reactive paint, gloss paint, semigloss paint, matt paint, undercoat, topcoat material, single-coat paint, wood paint, can paint, paper varnish, leather varnish, window paint, marine paint, furniture paint, automotive paint, coil-coating paint.

In one particularly preferred embodiment the paint formulation comprises water; with very particular preference, based on the total amount of organic solvents and water, the paint formulation comprises not more than 10% by weight of organic solvent.

The present invention also relates to a mixture comprising as component a1 at least one surfactant and as component a2 at least one compound corresponding to the general formula (I)

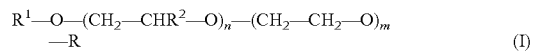

in which $R^1$ is phenyl or substituted phenyl, $C_4$-$C_{14}$ alkyl, $R^2$ is $C_1$-$C_8$ alkyl, $R^3$ is hydrogen, $C_1$-$C_6$ alkyl, benzoyl, acetyl, acryloyl, methacryloyl, n has an average value of 0 to 10, m has an average value of 1 to 10, where n+m≧10 and m>n, and the alkylene oxide structural units, which are different if appropriate, can be distributed randomly or arranged in blocks, and the mixture at a concentration of 0.2 g/l in water at 23° C. leads to a reduction in the contact angle on steel in comparison to pure water after 1 s by at least 15°, and the mixture in the CNOMO (prEN 14371:2004, 0.1 g/l, 25° C., measurement in water) possesses a foamability of less than 1200 ml during pumped circulation.

For $R^1$, $R^2$, $R^3$, n and m the comments already made above apply.

EXAMPLES

Example 1

Preparation of phenol+5 EO from phenyl diglycol

A 2 l autoclave was charged with 696 g of phenyl diglycol and 3 g of KOH flakes. Inertizing with nitrogen was followed by dewatering at 20 mbar and 100° C. for 1.5 h. The reduced pressure was removed by adding nitrogen and the reaction mixture was heated to 150° C. At this temperature 504 g of ethylene oxide were metered in with stirring, and after the end of reaction stirring was continued at 150° C. for 1 h and then the mixture was cooled to 80° C. and the autoclave was discharged. Finally the reaction mixture was adjusted to a pH of 7.0 (measured as a 5% strength solution in water) by adding acetic acid.

The products stated have the following compositions:

Plurafac LF grades are low-foaming nonionic surfactants which are composed of alkoxylated fatty alcohols. Besides ethylene oxide they comprise further, higher alkylene oxides in the polyether chain Emulan HE 50 is a $C_4$-$C_8$ alcohol which has been reacted with 5 ethylene oxide units.

Lutensol XP 40 is a nonionic surfactant based on a $C_{10}$ Guerbet alcohol. The alcohol has been reacted with 4 ethylene oxide units.

The following results can be read from the table:

The performance boosters Emulan HE 50, Lutensol XP 40 and the two phenol ethoxylates, used as component a2, lead on their own only to a very slight reduction in the contact angle on the different surfaces in comparison to pure water.

The mixtures of the boosters, i.e., of component a2, with the surfactants Plurafac LF 400, LF 431 and LF 305 lead particularly with short contact times of less than 1 s to a marked reduction in the contact angle as compared with the surfactants alone.

The properties of compounds such as Surfynol and Dynol can even be exceeded through the use of the performance boosters in combination with conventional nonionic surfactants.

TABLE 1

Contact angles between solution in water and solid surface

| Measuring temp. | Product | Glass 0.03 s | Glass 0.08 s | Glass 1 s | Steel 0.03 s | Steel 0.08 s | Steel 1 s | PE 0.03 s | PE 0.08 s | PE 1 s |
|---|---|---|---|---|---|---|---|---|---|---|
| 23° C. | Water | | | | 66 | 66 | 66 | | | |
| 40° C. | Water | 45 | 43 | 40 | 66 | 66 | 66 | 95 | 94 | 93 |
| 23° C. | Plurafac LF 400 | | | | 50 | 48 | 35 | | | |
| 40° C. | Plurafac LF 400 | | | | 40 | 40 | 28 | | | |
| 23° C. | Plurafac LF 431 | | | | 52 | 51 | 42 | | | |
| 40° C. | Plurafac LF 305 | 41 | 40 | 31 | 46 | 46 | 39 | 58 | 56 | 48 |
| 23° C. | Lutensol XP 40 | 44 | 42 | 36 | 53 | 52 | 50 | 72 | 70 | 67 |
| 23° C. | Emulan HE 50 | | | | 62 | 62 | 62 | | | |
| 40° C. | Emulan HE 50 | 44 | 42 | 40 | 62 | 62 | 62 | 80 | 80 | 80 |
| 40° C. | Phenol 5 EO | 47 | 44 | 43 | 63 | 62 | 62 | 85 | 83 | 82 |
| 23° C. | Surfynol S 104 | | | | 60 | 59 | 59 | | | |
| 40° C. | Surfynol S 104 | 45 | 40 | 38 | 58 | 57 | 57 | 71 | 71 | 71 |
| 23° C. | Dynol 604 | | | | 43 | 42 | 38 | | | |
| 40° C. | Dynol 604 | 45 | 38 | 32 | 42 | 42 | 35 | 53 | 51 | 46 |
| 23° C. | LF 431/XP 40 (1/1) | | | | 50 | 49 | 46 | | | |
| 23° C. | LF 431/HE 50 (7/3) | | | | 47 | 45 | 37 | | | |
| 23° C. | LF 400/HE 50 (7/3) | | | | 44 | 43 | 38 | | | |
| 40° C. | LF 305/HE 50 (1/1) | 37 | 36 | 30 | 43 | 43 | 39 | 53 | 52 | 48 |
| 40° C. | LF 400/HE 50 (1/1) | | | | 37 | 36 | 30 | | | |
| 40° C. | LF 305/Phenol 5 EO | | | | 44 | 44 | 39 | 57 | 55 | 48 |
| 23° C. | LF 400/Phenol 5 EO | | | | 45 | 43 | 37 | | | |

The contact angle is measured with time resolution. Table 1 specifies the contact angles on each of the three materials glass, stainless steel and polyethylene after a measuring time of 0.03 s, 0.08 s and 1 s. The surfactants were analyzed in the form of a solution of 0.2 g of product in water. Plurafac, Lutensol and Emulan products are brand names of BASF Aktiengesellschaft. The products described are available commercially. Surfynol® S 104 and Dynol™ 604 are available from AirProducts. LF 431 is used as an abbreviation of Plurafac LF 431, LF 400 and LF 305 analogously for Plurafac LF 400 and Plurafac LF 305. HE 50 is used as an abbreviation of Emulan HE 50, and XP 40 is an abbreviation of Lutensol XP 40.

The contact angle is measured using the video-assisted high-speed contact angle measuring instrument, "OCAH 200" from the company dataphysics. The high-speed camera takes 360 pictures per second, and the sessile drop method was used for the measurement. The surfaces under consideration are composed of polyethylene, stainless steel and glass. The surfaces were freed from impurities prior to each measurement. If necessary this was done using acetone as solvent and the surface was subsequently dried. For each measurement series, as a reference, the contact angle of pure water was determined for comparison. The reduction of the contact angle in comparison to pure water that is achieved by adding the test substances is substantial.

TABLE 2

Contact angles between solution in 5% strength butyl glycol/water mixture and solid surface

|  | Steel | | |
| --- | --- | --- | --- |
| Product | 0.03 | 0.08 | 1 |
| 5% Butyl glycol | 31 | 31 | 31 |
| Plurafac LF 400 | 29 | 28 | 19 |
| Plurafac LF 431 | 31 | 30 | 20 |
| Surfynol S 104 | 31 | 30 | 30 |
| Dynol 604 | 28 | 28 | 26 |
| LF 431/HE 50 (7/3) | 25 | 24 | 20 |
| LF 400/HE 50 (7/3) | 22 | 22 | 17 |

All measurements in Table 2 were carried out at 23° C. The products were measured at a concentration of 0.2 g/l in a 5% strength butyl glycol solution in water.

In addition to the effects already described above it can be seen that the effect of the added boosters, component a2, is not the effect which can be achieved by adding a simple solvent such as butyl glycol. Despite the comparatively high concentration of butyl glycol as compared with Emulan HE 50 in the above experiments, the effect of component a2 is clearly in evidence.

TABLE 3

Surface tension (SFT) in water

| Product | In solution in | Temperature | SFT [mN/m] | | | |
| --- | --- | --- | --- | --- | --- | --- |
| | | | 1 s | 0.1 s | 0.01 s | 0.001 s |
| Water | Water | 23° C. | 71.9 | 71.8 | 71.7 | 71.7 |
| Plurafac LF 400 | Water | 23° C. | 33.5 | 43.5 | 56.5 | 65.8 |
| Emulan HE 50 | Water | 23° C. | 65.5 | 67.5 | 69.8 | 71.4 |
| LF 400/HE 50 (1/1) | Water | 23° C. | 38.5 | 49.8 | 59.1 | 59.3 |
| 5% Butyl glycol | 5% Butyl glycol | 23° C. | 37.4 | 37.4 | 37.4 | 37.4 |
| Plurafac LF 400 | 5% Butyl glycol | 23° C. | 30.9 | 32.2 | 34.2 | 36.2 |
| LF 400/HE 50 (7/3) | 5% Butyl glycol | 23° C. | 31.8 | 32.3 | 33.4 | 35.1 |
| Plurafac LF 431 | 5% Butyl glycol | 23° C. | 31.4 | 33.2 | 35.7 | 38.2 |
| LF 431/HE 50 (7/3) | 5% Butyl glycol | 23° C. | 31.9 | 34.3 | 35.3 | 35.9 |

The measurements were carried out with a concentration of 1.0 g of the surfactant or of the surfactant mixture in 1 l of the stated solvent. Under time resolution, the surface tension of the solution was determined using a bubble pressure tensiometer. Here again it can be seen that the booster, component a2 (in this case Emulan HE 50), is capable, particularly in the case of short times, of lowering the surface tension when it is used as an additive to another surfactant. The surface tension in the case of short times is always lower than that of the surfactant used and at the same time markedly lower than that of a solution of the booster (in this case Emulan HE 50).

Here again it can be seen in turn that the effect is perceptible even in the presence of a solvent (such as butyl glycol).

The surface tensions were measured using a bubble pressure tensiometer from Lauda (model MPT 2).

TABLE 4

Foam behavior in the circulation foam test (modeled on prEN 14371:2004)

| | Results at 25° C., 0.1 g/l | | |
| --- | --- | --- | --- |
| Measurement in water as solvent | Foamability according to prEN 14371:2004 | Foam 1 min after end of circulation | Foam at end of test (15 min) |
| Plurafac LF 431 | 200 ml | 30 ml | 0 |
| Plurafac LF 431/ Emulan HE 50 (7/3) | 260 ml | 40 ml | 0 |
| Pluronic PE 6100 | 180 ml | 0 | 0 |
| Lutensol AO 7 | >1500 ml | 1500 ml | 1500 ml |
| Lutensol TO 8 | >1500 ml | 1500 ml | 1250 ml |
| Lutensol TO 12 | >1500 ml | 1500 ml | 1500 ml |
| Dynol 604 | 260 ml | 40 ml | 40 ml |
| Surfynol S 104 | 160 ml | 0 | 0 |

TABLE 5

| | Results at 25° C., 0.1 g/l | | |
| --- | --- | --- | --- |
| Measurement in a mixture of 5% butyl glycol and 95% water | Foamability according to prEN 14371:2004 | Foam 1 min after end of circulation | Foam at end of test (15 min) |
| Plurafac LF 400 | 110 ml | 0 | 0 |
| Plurafac LF 400/Emulan HE 50 (7/3) | 115 ml | 0 | 0 |
| Plurafac LF 431 | 40 ml | 0 | 0 |
| Plurafac LF 431/Emulan HE 50 (7/3) | 80 ml | 0 | 0 |
| Pluronic PE 6100 | 180 ml | 0 | 0 |
| Dynol 604 | 90 ml | 0 | 0 |
| Surfynol S 104 | 150 ml | 0 | 0 |

The data in Tables 4 and 5 were each measured at 25° C. and a concentration of 0.1 g/l test substance in the respective solvent (water or 5% butyl glycol).

From the data in the tables it is evident that the formulations with a booster (in this case Emulan HE 50) are as good as or even better in terms of foam behavior than common defoamers known in the market, such as Pluronic PE 6100 or Surfynol S 104. This applies particularly to measurements which are carried out in the presence of a further solvent (such as butyl glycol).

The formulations with an inventive component a2, a booster, can therefore be used in coating applications, i.e. coating material formulations, in terms of their foam behavior as well.

We claim:

1. A coating material formulation comprising
(A) 0.001%-45% by weight of a mixture comprising as component a1 at least one surfactant and as component a2 at least one compound corresponding to general formula (1)

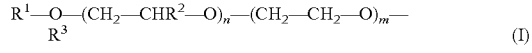

in which
$R^1$ is phenyl or substituted phenyl,
$R^2$ is $C_1$-$C_8$ alkyl, $R^3$ is $C_1$-$C_6$ alkyl, benzoyl, acetyl, acryloyl or methacryloyl, n has an average value of 0 to 10, m has an average value of 1 to 10, where n+m≦10 and m>n, and the alkylene oxide structural units, which are optionally different, can be distributed randomly or arranged in blocks, wherein the ratio of component a1 to component a2 is 1:4 to 20:1, (B) 1%-95% by weight of film-forming binders and resins selected from the group consisting of nitrocellulose, alkyd resins, polyester resins, melamine-formaldehyde resins, acrylic resins, aqueous acrylate dispersions, polyurethane resins, polymers of vinyl chloride or vinyl ethers, epoxy acrylates, polyester acrylates, polyether acrylates, urethane acrylates, aldehyde resins, ketone resins, amino resins, carbamide resins, casein and mixtures thereof, (C) 0%-80% by weight of fillers, (D) 0%-40% by weight of pigments, (E) 0%-20% by weight of additives, and (F) 0%-90% by weight of organic solvents and/or water, the sum of the weight percentages of components (A) to (F) being 100% by weight, wherein the mixture (A) at a concentration of 0.2 g/l in water at 23° C. leads to a reduction in the contact angle on steel in comparison to pure water after 1 s by at least 15°, and the mixture in the CNOMO (prEN 14371:2004, 0.1 g/l, 25° C., measurement in water) possesses a foamability of less than 1200 ml during pumped circulation.

2. The formulation according to claim 1, wherein component a1 of mixture (A) comprises precisely one surfactant.

3. The formulation according to claim 1, wherein component a1 of mixture (A) comprises at least one nonionic surfactant.

4. The formulation according to claim 3, wherein component a1 of mixture (A) comprises precisely one nonionic surfactant.

5. The formulation according to claim 1, wherein n=0 and m=3-9.

6. A method for lowering the surface tension in a coating material comprising addition of the mixture according to claim 1 to said coating material.

7. The method according to claim 6, wherein the coating material is a paint formulation.

8. The method according to claim 7, wherein the paint formulation comprises water.

9. The method according to claim 8, wherein the paint formulation, based on the total amount of organic solvents and water, comprises not more than 10% by weight of organic solvent.

10. A method comprising painting a building material with the coating material formulation according to claim 1.

* * * * *